(12) United States Patent
Okada et al.

(10) Patent No.: US 6,299,202 B1
(45) Date of Patent: Oct. 9, 2001

(54) PASSENGER SEAT AIR BAG SYSTEM

(75) Inventors: Yasushi Okada, Ichinomiya; Kazumasa Suzuki, Ogaki; Tatsuo Hirano, Komaki; Yuji Kuriyama, Seki, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/472,899

(22) Filed: Dec. 28, 1999

(30) Foreign Application Priority Data

Dec. 28, 1998 (JP) .................................................. 10-373695
Dec. 28, 1998 (JP) .................................................. 10-373726

(51) Int. Cl.⁷ .................................................. B60R 21/16
(52) U.S. Cl. ........................................ 280/732; 280/743.1
(58) Field of Search ................................. 280/732, 743.1

(56) References Cited

U.S. PATENT DOCUMENTS

| 5,613,698 | * | 3/1997 | Patercsak et al. | 280/732 |
| 5,636,860 | * | 6/1997 | Fischer et al. | 280/743.1 |
| 5,636,861 | * | 6/1997 | Orsulak et al. | 280/732 |
| 5,746,447 | * | 5/1998 | Dyer et al. | 280/743.1 |
| 5,803,486 | * | 9/1998 | Lunt | 208/743.1 |

FOREIGN PATENT DOCUMENTS

| 4442118 A1 | 6/1995 | (DE) . |
| 29606709 U1 | 9/1996 | (DE) . |
| 4218659C2 | 10/1996 | (DE) . |
| 29721678 U1 | 3/1998 | (DE) . |
| 07277125 A | 10/1995 | (JP) . |
| 7-291068 | 11/1995 | (JP) . |
| 9-263203 | 10/1997 | (JP) . |
| 09309395 A | 12/1997 | (JP) . |

\* cited by examiner

Primary Examiner—Kenneth R. Rice
(74) Attorney, Agent, or Firm—Pillsbury Winthrop LLP

(57) ABSTRACT

In a passenger seat air bag system, when inflating gas is made to flow through a gas inlet into an air bag folded, received and fixed in a case in order to unfold and inflate the air bag, the air bag opens a door disposed in an instrument panel, projects therefrom, and inflates toward the rear side of a vehicle. A cover portion of a flow control cloth is provided inside the air bag so as to cover the gas inlet so that the cover portion closes the opposite sides of the gas inlet in the right/left direction of the vehicle while the cover portion leaves the opposite sides of the gas inlet in the front/rear direction of the vehicle open. The cover portion of the flow control cloth is disposed so that its center in the front/rear direction of the vehicle is shifted from the center of the gas inlet toward the rear side of the vehicle. The air bag is folded, received and fixed in the case so that its ceiling wall portion opposite to the gas inlet is disposed close to the gas inlet, while the air bag is transversely folded so that its front and rear edges are disposed close the vicinity of the center, and while the air bag is longitudinally folded so that its left and right edges are disposed close to the vicinity of the center. The front portion of the air bag is folded in the form of bellows in the state where the front edge is folded back on the ceiling wall portion side so as to lap over the ceiling wall portion when the air bag is folded transversely.

15 Claims, 13 Drawing Sheets

PASSENGER SEAT AIR BAG SYSTEM

BACKGROUND OF THE INVENTION

1. Field of the Invention

The present invention relates to a passenger seat air bag system disposed in a portion of an instrument panel in front of a front passenger seat of a vehicle.

The present application is based on Japanese Patent Applications No. Hei. 10-373695 and 10-373726, which are incorporated herein by reference.

2. Description of the Related Art

In the conventional passenger seat air bag system, when an air bag was inflated and unfolded, inflating gas was introduced into the air bag through a gas inlet so that the air bag projected from a portion of an instrument panel and inflated toward the rear side of a vehicle along a wind shield inclined to the front side.

However, there were some cases where it was demanded to reduce the inflating speed of the air bag toward a passenger sitting on the passenger seat, that is, the inflating speed of the air bag toward the rear side of the vehicle.

To meet this demand, there is such a proposal that a flow control cloth is provided inside an air bag so as to cover a gas inlet so that the flow control cloth closes the opposite sides of the air bag in the left/right direction of a vehicle while the flow control cloth leaves the opposite sides of the air bag in the front/rear direction of the vehicle opened (see Japanese Patent Publication No. Hei. 9-263203).

With such a flow control cloth provided in an air bag, when the air bag is to be inflated and unfolded, the inflating gas introduced into the air bag branches into front and rear flows by the presence of the flow control cloth, so that the air bag is unfolded quickly in the front/rear direction. Then, the front portion of the air bag projects toward the rear side of the vehicle along the wind shield. On the other hand, the rear portion of the air bag projects toward the rear side of the vehicle along the upper surface of the instrument panel.

Thus, at the beginning of the unfolding and inflation of the air bag, the air bag inflates toward the rear side of the vehicle with a wide angle spread vertically to thereby occupy a space between the inner surface of the wind shield and the upper surface of the instrument panel. Thus, the air bag moves toward the rear side of the vehicle while spreading its passenger-side portion as a face broadly, so that the speed of the inflation toward the rear side of the vehicle can be reduced.

When such a flow control cloth is provided, the flow rate of the inflating gas flowing into the air bag is preferably set so that the flow rate on the front side is larger than that on the rear side.

That is, if the amount of the inflating gas flowing to the front portion of the air bag is increased, it becomes easy to dispose the front portion of the air bag on the upper side along the wind shield in the initial stage of the unfolding and inflation of the air bag so that the rear portion of the air bag can be located along the upper surface of the instrument panel. As a result, the air bag can be inflated so that the surface facing a passenger at the time of the unfolding and inflation of the air bag is disposed vertically. Accordingly, even if the passenger is bound during the unfolding and inflation of the air bag, the force with which the air bag presses the passenger can be restricted preferably.

To control the flow rate of the inflating gas, it can be considered that the length on the front edge side of the flow control cloth is made long while the length on the rear edge side of the cloth is made short, so that the front-side opening is made larger than the rear-side opening which openings are provided inside the air bag by the flow control cloth.

However, when the flow control cloth is thus disposed inside the air bag in a manner so that the length on the front edge side of the flow control cloth is made long while the length on the rear edge side of the cloth is made short, a great volume of materials for the flow control cloth is required. In addition, the flow control cloth becomes so long that it becomes difficult to perform the working of setting up the flow control cloth by stitch or the like.

In addition, the air bag of the passenger seat air bag system was folded so that the ceiling wall portion side opposite to the gas inlet was made close to the gas inlet side. The air bag was fixedly received in the case while being folded by horizontal folding by which the front and rear opposite edges were made close to each other near the center and vertical folding by which the left and right edges were made close to each other near the center.

In folding the air bag, there was a case where the front portion was folded in the form of bellows at the time of the horizontal folding (see Japanese Patent Publication No. Hei. 7-291068).

In the case where this front portion is folded in the form of bellows, the front portion can indeed unfold quickly compared with the case of roll folding or the like when the inflating gas is introduced into the air bag, but the force with which the front portion collides against the wind shield becomes larger.

Further, at the time of unfolding and inflation, the air bag is unfolded and inflated toward the vehicle rear side along the wind shield. Therefore, the vicinities of the front edge of the air bag move toward the vehicle rear side while rubbing on the wind shield over a long distance. As a result, there is a fear that the air bag is damaged.

SUMMARY OF THE INVENTION

It is therefore a first object of the present invention to solve the foregoing problems, that is, to provide a passenger seat air bag system in which, when the air bag is unfolded and inflated, the air bag can be quickly unfolded while a front portion of an air bag is restrained from getting a shock or ribbing to a wind shield.

Further, it is a second object of the invention to 5 provide a passenger seat air bag system in which material for a flow control cloth is restrained from increasing, and the amount of inflating gas flowing from a front opening of the flow control cloth can be easily ensured to be larger than that from a rear opening.

According to the present invention, a passenger seat air bag system is constituted by a case received in an instrument panel disposed under a wind shield of a vehicle, a door formed as a portion of a top surface of the instrument panel in an upper portion of the case, and an air bag folded, received and fixed in the case.

When inflating gas flows into the air bag through a gas inlet of the air bag, the air bag is unfolded and inflated to open the door so that the air bag projects from the door and expands toward a rear side of the vehicle along the wind shield.

Here, the air bag has a ceiling wall portion opposite to the gas inlet, front and rear edges located on front and rear sides of the vehicle, and left and right edges located on left and right sides of the vehicle. Further, before the air bag is unfolded, the air bag is folded so that the ceiling wall portion is disposed close to the gas inlet, while the air bag is transversely folded so that the front and rear edges are disposed close to each other near the center of the air bag in front/rear direction of the vehicle, while the air bag is longitudinally folded so that the left and right edges are made close to each other near the center of the air bag in the right/left direction of the vehicle. Further, a front portion of the air bag is folded in a form of bellows in a state where the front edge is folded to lap over the ceiling wall portion.

Further, in the air bag, a flow control cloth may be provided in an air bag main body in such a manner that the flow control cloth is attached to an inside of the air bag main body so as to cover the gas inlet in a condition that the flow control cloth closes opposite sides of the gas inlet in right/left direction of the vehicle while the flow control cloth leaves opposite sides of the gas inlet in front/rear direction of the vehicle opened. In this case, the flow control cloth is disposed so that the center of the flow control cloth in the front/rear direction of the vehicle is shifted from the center of the gas inlet in the front/rear direction of the vehicle toward the rear side of the vehicle.

Further, the center of the flow control cloth is disposed so as to be shifted within a range where a front edge of the flow control cloth is disposed in a more forward side of the vehicle than a front edge of the gas inlet.

In the passenger seat air bag system according to the present invention, the front portion of the air bag is folded in the form of bellows in the state where the front edge is folded to lap over the ceiling wall portion when the air bag is transversely folded. Accordingly, when the inflating gas is introduced into the air bag, this lapping-over portion lapping over the ceiling wall portion and the lapped-over portion of the ceiling wall portion are integrated with each other in the front portion of the air bag to unfold quickly so as to release the bellows.

In addition, the lapping-over portion leaves the lapped-over portion while rotating forward around a crease portion where the lapping-over portion is folded over the lapped-over portion so as to release the crease.

Then, the lapped portion and the lapping-over portion unfolded along the wind shield are further unfolded so as to release the creases of the bellows. The inflation of he air bag is thus completed.

That is, the portion which is to give a hard impact to the wind shield is the crease portion where the lapping-over portion is folded over the lapped-over portion at the beginning of the unfolding and inflation of the air bag.

In addition, the portion which inflates to make the crease portion abut against the wind shield is the lapping-over portion and the lapped-over portion under the crease portion. However, since the lapping-over portion is to rotate forward around the crease portion where the lapping-over portion is folded, the portion which is to receive the pressure of the inflating gas so as to abut against the wind shield is a short portion mainly consisting of the lapped-over portion.

Therefore, the energy of the impact against the wind shield when the air bag is unfolded and inflated turns into the energy with which the short lapped-over portion unfolds and inflates to release the bellows. The lapped-over portion is small in volume and small in size so that the impact given to the wind shield can be reduced in comparison with the case where the front portion of the air bag is simply folded in the form of bellows.

In addition, the front edge of the air bag does not touch the wind shield before the lapping-over portion rotates forward around the crease portion where the lapping-over portion is folded. Accordingly, the length with which the air bag rubs against the wind shield is shortened so that it is possible to restrain the air bag from being damaged.

Therefore, in the passenger seat air bag system according to the present invention, the front portion of the air bag can be unfolded quickly while being restrained from impacting or rubbing against the wind shield when the air bag is unfolded and inflated, so that it is possible to improve the passenger binding performance.

In the passenger seat air bag system according to the present invention, a cover portion of an air flow cloth is provided inside the air bag so as to cover the gas inlet. The cover portion of the flow control cloth is disposed so that its center is shifted from the center of the gas inlet toward the rear side of the vehicle. Accordingly, the distance between the front edge of the gas inlet and the front edge of the cover portion is short, and the distance between the rear edge of the gas inlet and the rear edge of the cover portion is long. As a result, the inflating gas which flows into the air bag through the gas inlet flows chiefly through the front edge side of the cover portion having a low resistance to the passage of the inflating gas.

As a result, the flow rate of the inflating gas through the front opening formed by the flow control cloth can be ensured to be higher than that through the rear opening.

In addition, the cover portion of the flow control cloth is disposed so as to be shifted simply from the center of the gas inlet toward the rear side of the vehicle without elongating the front edge of the cover portion. It is therefore possible to perform this configuration easily without using a plenty of material. In addition, the cover portion can be shortened, so that the working of installation of the flow control cloth such as stitching or the like becomes easy because the cover portion is not bulky.

Accordingly, in the passenger seat air bag system according to the present invention, the material for the flow control cloth can be restrained from increasing, while the flow rate of the inflating gas through the front opening formed by the cover portion of the flow control cloth can be easily ensured to be higher than that through the rear opening.

The cover portion is disposed so that the center of the cover portion is shifted within a range where the front edge of the cover portion is disposed in a more forward side than the front edge of the gas inlet. This is because, if the front edge of the cover portion were disposed behind the front edge of the gas inlet, the inflating gas would flow into the air bag without interference with the cover portion of the flow control cloth when the air bag is unfolded and inflated, so that the provision of the flow control cloth is meaningless.

If the air bag is transversely folded, the front portion of the air bag which is folded in the form of bellows unfolds quickly when the air bag is unfolded and inflated. On the other hand, the rear portion of the air bag which is folded to be rolled inward has a high resistance to unrolling, and the unfolding direction of the rear edge of the air bag is made downward reversely to the direction in which the inflating gas flows into the air bag. Accordingly, the rear portion of the air bag unfolds downward and slower than the front portion.

As a result, the front portion of the air bag unfolds quickly toward the rear side of the vehicle along the wind shield, while the rear portion of the air bag unfolds later than the front portion toward the rear side of the vehicle along the instrument panel. Accordingly, the ceiling wall portion of the air bag which is on the way of unfolding and inflation moves toward the rear side of the vehicle while having a face which is wide and close to the vertical plane. As a result, the passenger binding performance on the way of unfolding and inflation can be improved more greatly.

If the front portion of the air bag is folded in the form of bellows in the state where the front edge is folded to lap over the ceiling wall portion when the air bag is transversely folded, this lapping-over portion lapping over the ceiling wall portion and the lapped-over portion of the ceiling wall portion unfold quickly together, first of all, so as to release the bellows when the air bag is unfolded and inflated. However, the lapping-over portion leaves the lapped-over portion while rotating forward around the crease portion where the lapping-over portion is folded over the lapped-over portion so as to release the crease. Accordingly, all the front portion of the air bag is not to project to abut against the wind shield.

It is therefore possible to restrain an impact to the wind shield in comparison with the case where the front portion of the air bag is simply folded in the form of bellows. In addition, the front edge side of the air bag does not touch the wind shield until the lapping-over portion rotates forward around the crease portion where the lapping-over portion is folded. Accordingly, the length with which the front edge side of the air bag rubs against the wind shield is shortened, and the length with which other portions of the air bag rubs against the wind shield also becomes shorter than the length of the front edge of the air bag in the case where the front portion of the air bag is simply folded in the form of bellows. Accordingly, it is possible to contribute to restraining the air bag from being damaged.

Features and advantages of the invention will be evident from the following detailed description of the preferred embodiments described in conjunction with the attached drawings.

DETAILED DESCRIPTION OF THE PREFERRED EMBODIMENTS

A first embodiment of the present invention will be described below with reference to FIGS. 1 to 9.

Figure 1:
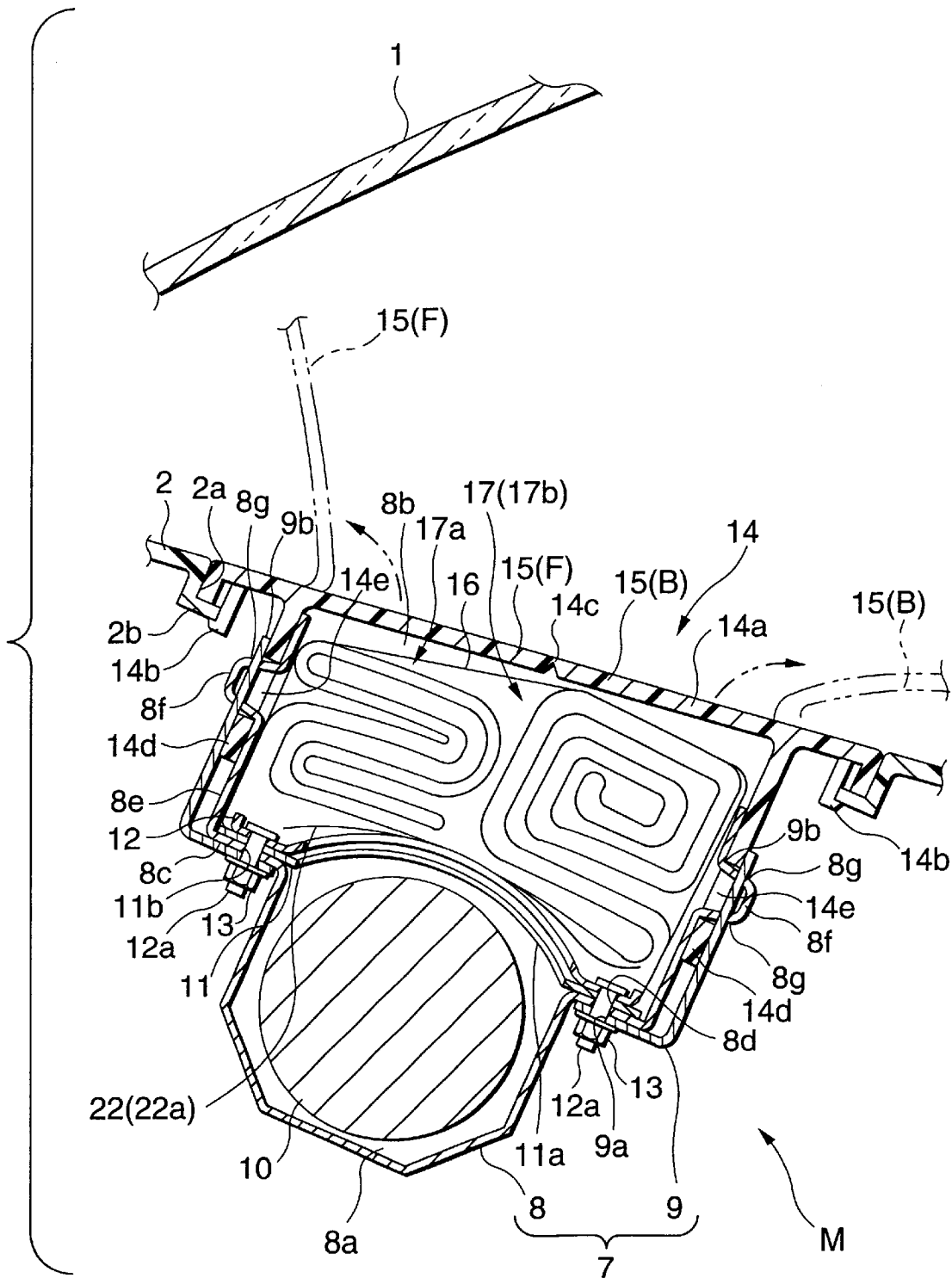
FIG. 1 is a sectional view in the front/rear direction of a vehicle, showing a state where an air bag system according to a first embodiment of the present invention is used.
Figure 2:
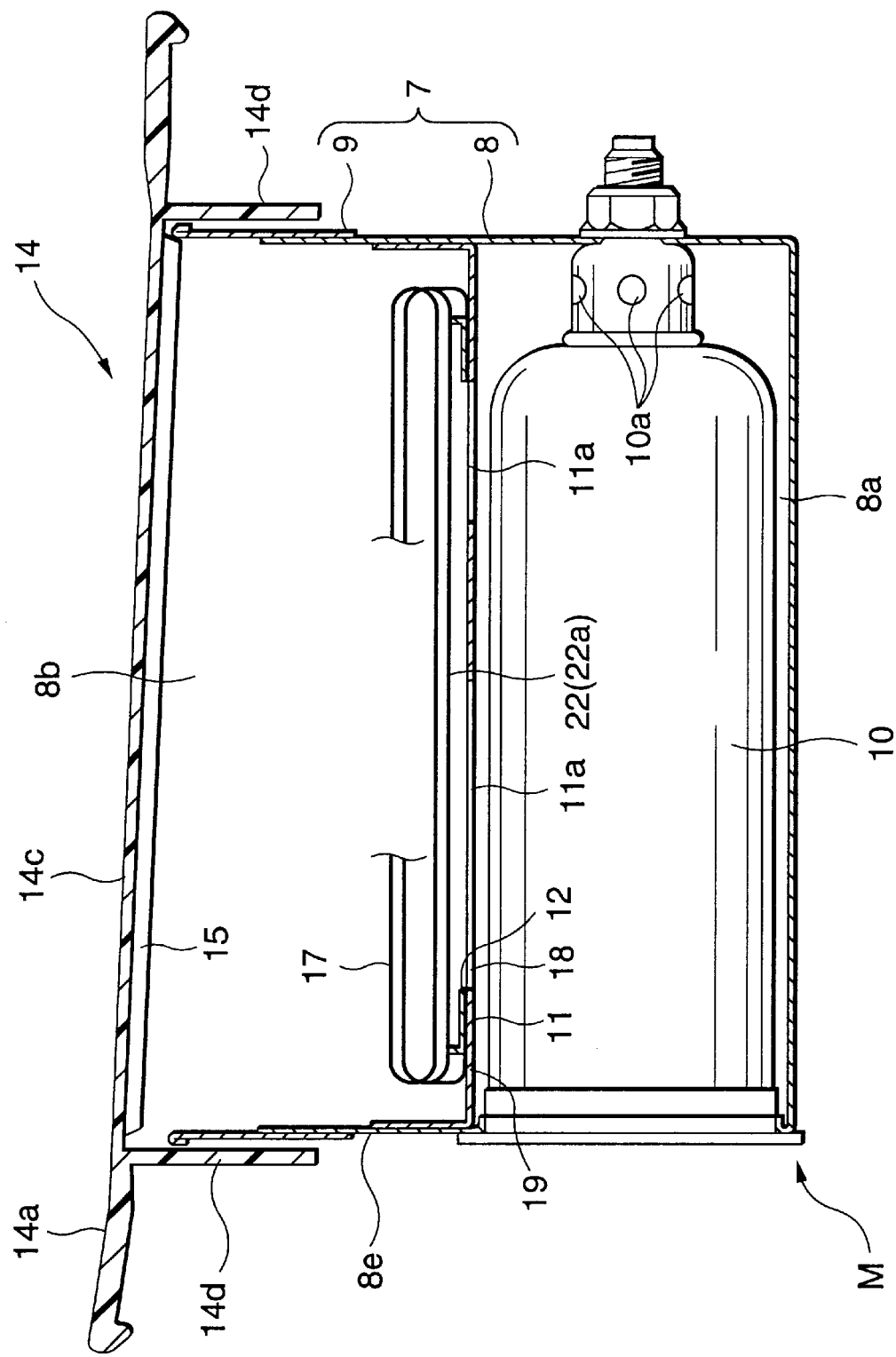
FIG. 2 is a sectional view in the left/right direction of the vehicle, showing a state where the air bag system of the first embodiment is used.
Figure 3:
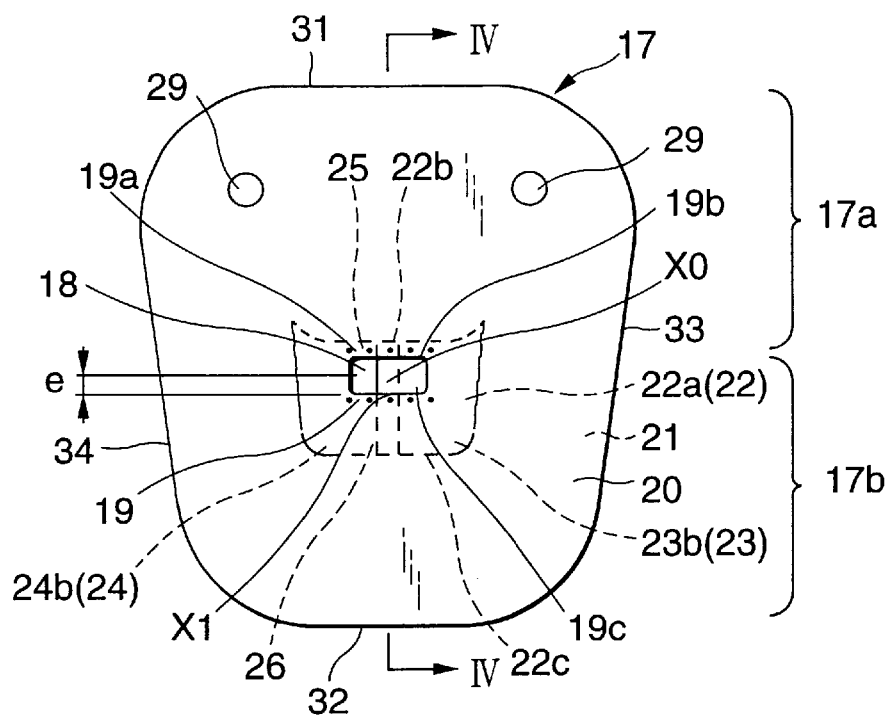
FIG. 3 is a bottom view of an air bag used in the first embodiment.

As shown in FIGS. 1 and 2, a passenger seat air bag system M in this embodiment is of a top mount type which is disposed in a portion of an instrument panel under a wind shield 1. The air bag system M is constituted by a case 7, an inflator 10, a diffuser 11, a retainer 12, a cover 14 and an air bag 17.

The case 7 is formed of a metal plate, and constituted by a body 8 which is shaped into a substantially rectangular parallelepiped, and a pressing plate material 9 which is disposed around an upper portion of the body 8. The body 8 is constituted by a lower portion chamber 8a for receiving the inflator 10, and an upper portion chamber 8b for receiving the air bag 7 folded up. The pressing plate material 9 is formed into a substantially square cylinder and covers not only lower portions of step portions 8c disposed on opposite sides in the front/rear direction of a vehicle in a lower portion of the upper portion chamber 8b, but also a circumferential wall 8e of the upper portion chamber 8b. Through holes 8d and 9a are formed in the step portions 8c and in the portions of the pressing plate material 9 which cover the step portions 8c so that respective bolts 12a of the retainer 12 are inserted into the through holes 8 and 9a.

A plurality of protrusion portions 8f are formed in front and rear portions of the circumferential wall 8e of the upper portion chamber 8b. The protrusion portions 8f are inserted into lock holes 14e provided in side wall portions 14d of the cover 14 which will be described later, so that the side wall portions 14d can be locked and prevented from coming off upward. A plug piece 9b is provided in the pressing member 9 and an insertion hole 8g is formed in each of the protrusion portions 8f so as to extend from the plug piece 9b.

The inflator 10 has a cylindrical shape and gas discharge ports 10a for inflating gas for inflating the air bag 17. The inflator 10 is received and retained in the lower portion chamber 8a of the case 7.

The diffuser 11 is made of a metal plate, and shaped into a substantially rectangular plate having a circumferential edge which is curved to be able to abut against the respective step portions 8c of the case body 8. The diffuser 11 is provided with gas flow holes 11a and 11a formed in predetermined position of the diffuser 11 so that inflating gas can be passed through the gas flow holes 11a and 11a. Through holes 11b are formed in the circumferential edge of the diffuser 11 so that the respective bolts 12a of the retainer 12 are inserted into the through holes 11b.

The retainer 12 is made of a metal plate and shaped into a curved square annulus. The retainer 12 is provided with the above-mentioned bolts 12a which extend downward. This retainer 12 performs a part in which the respective bolts 12a are inserted into attachment holes 19a of the air bag 17 which will be described later, the above-mentioned through holes 11b of the diffuser 11, the above-mentioned through holes 8d of the case body 8, and the above-mentioned through holes 9a of the pressing member 9. Nuts 13 are screwed onto the bolts 12a so that the air bag 17 together with the diffuser 11 is fixed to the case 7 and the case 7 per se is assembled thus.

The cover 14 is formed of olefin or styrene thermoplastic elastomer, or the like, and constituted by a ceiling wall portion 14a and the above-mentioned side wall portions 14d. The ceiling wall portions 14a is disposed in a rectangular opening 2a which is opened in the substantially up/down direction in the instrument panel 2. The side wall portions 14d define a square cylindrical shape and extend downward from the lower surface of the ceiling wall portion 14a. A plurality of lock nails 14b to be locked at circumferential edges 2b of the opening 2a are formed on the lower surfaces of the outer circumferential edges of the ceiling wall portion 14a in order to improve the parting of the ceiling wall portion 14a from the instrument panel 2. In addition, a pair of doors 15 are provided in a portion which is inside the side wall portions 14d in the ceiling wall portion 14a. The doors 15 can be opened along a thin rupture presumptive portion 14c when the air bag 17 is to be inflated. Viewed from above in the front-rear direction of the vehicle, the rupture presumptive portion 14c is formed into an "H" shape. The pair of doors 15 are arranged in the front and rear portions of the vehicle so that the door 15(F) disposed on the front side opens forward while the door 15(B) disposed on the rear side opens backward when the air bag 17 is inflated.

In addition, a plurality of lock holes 14e are formed in the side wall portions 14d respectively. The above-mentioned protrusion portions 8f formed on the circumferential wall 8e of the case body 8 are locked in the lock holes 14e.

Figure 4:
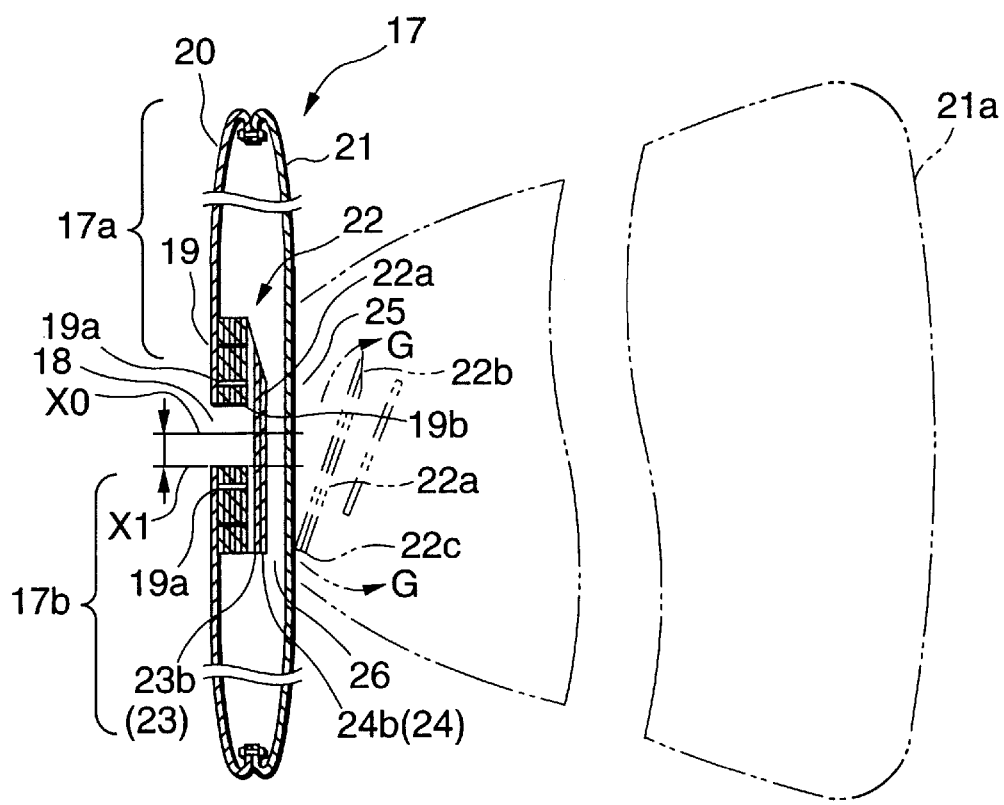
FIG. 4 is a sectional view taken on line IV—IV of FIG. 3.
Figure 6:
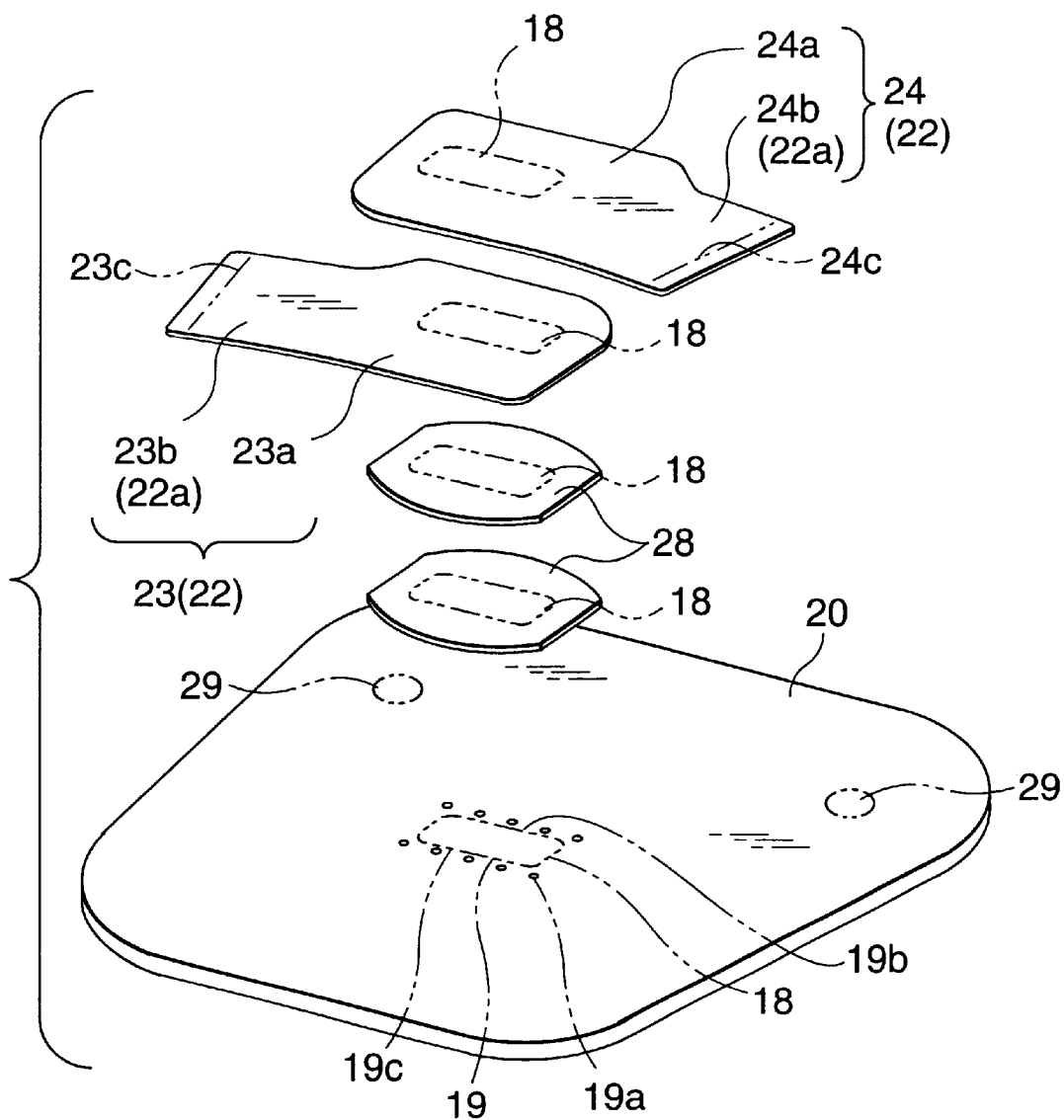
FIG. 6 is a perspective view on the way of the step of manufacturing the air bag of the first embodiment, showing a cloth material and so on disposed on the side wall portion of the inlet.
Figure 7:
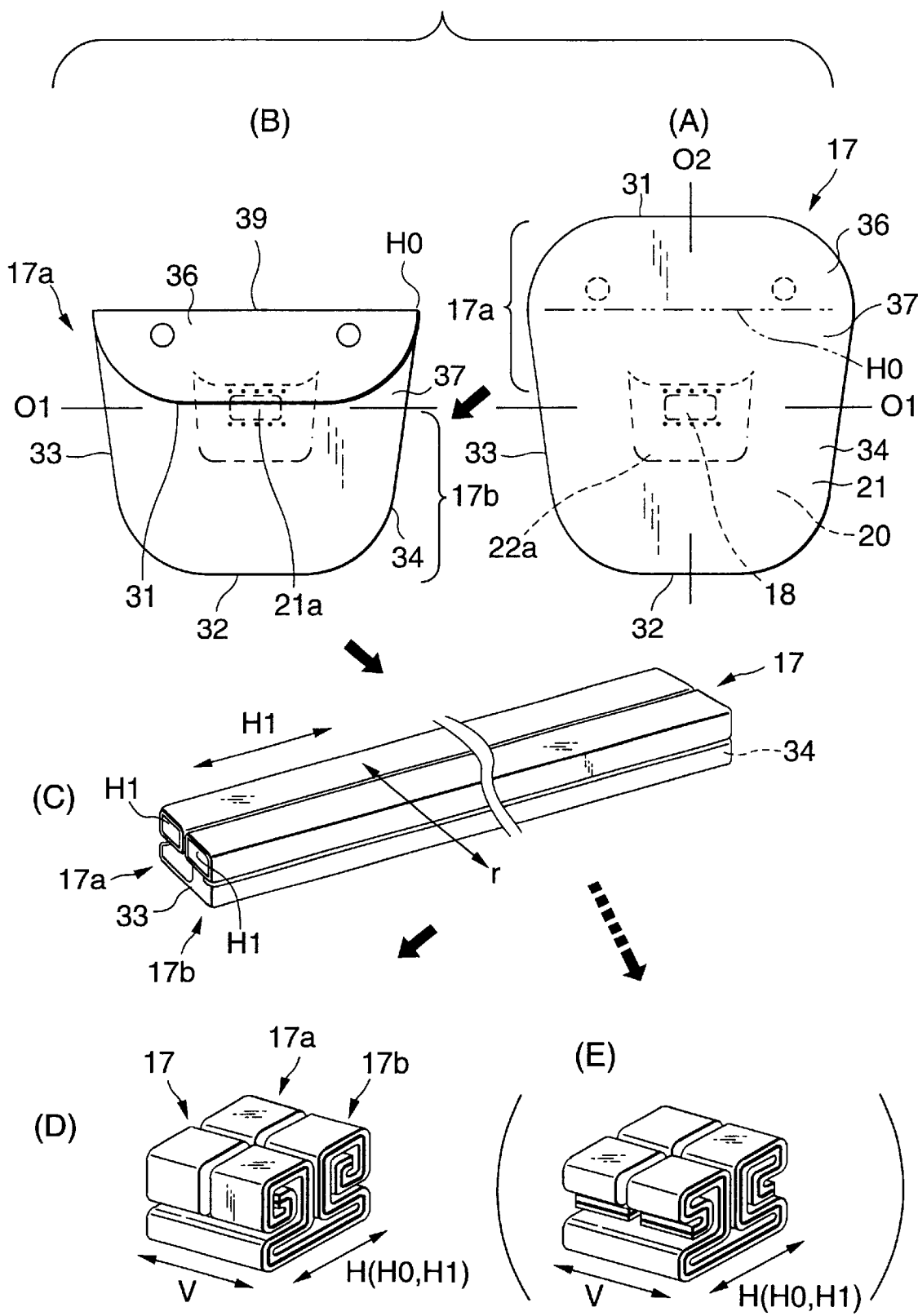
FIG. 7 is a view for explaining a step of folding the air bag of the first embodiment.

The air bag 17 is, as shown in FIGS. 1 to 4, produced in the form of a bag having a gas inlet 18 in such a manner that two sheets of woven cloth such as polyamide yarn, polyester yarn or the like having flexibility are prepared for an inlet-side wall portion 20 provided with the gas inlet 18 and a ceiling wall portion 21 opposite to the gas inlet 18, and the circumferential edges of these sheets are sewn on each other. The inlet-side wall portion 20 and the ceiling wall portion 21 constitute an air bag main body. Thus, the air bag 17 is designed to have a substantially truncated prismoid as shown by the two-dot chain line in FIG. 4 when the air bag 17 is inflated. An attachment piece portion 19 to be attached to the case 7 is formed at the circumferential edge of the gas inlet 18. The attachment piece portion 19 is provided with attachment holes 19a and the above-mentioned bolts 12a of the retainer 12 are inserted into the attachment holes 19a respectively. In addition, as shown in FIGS. 4 and 6, a pair of reinforcing cloths 28 and 28 formed of woven cloth such as polyamide yarn, polyester yarn or the like having flexibility are sewn on the attachment piece portion 19 by use of sawing yarn 27. The reference numeral 29 represents a vent hole.

This air bag 17 has a flow control cloth 22 which is disposed inside to cover the gas inlet 18. The flow control cloth 22 closes the opposite sides of the gas inlet 18 in the left/right direction of the vehicle when the air bag 17 is mounted on the vehicle, but to open the opposite sides of the gas inlet 18 in the front/rear direction of the vehicle when the air bag 17 is mounted on the vehicle.

Figure 5:
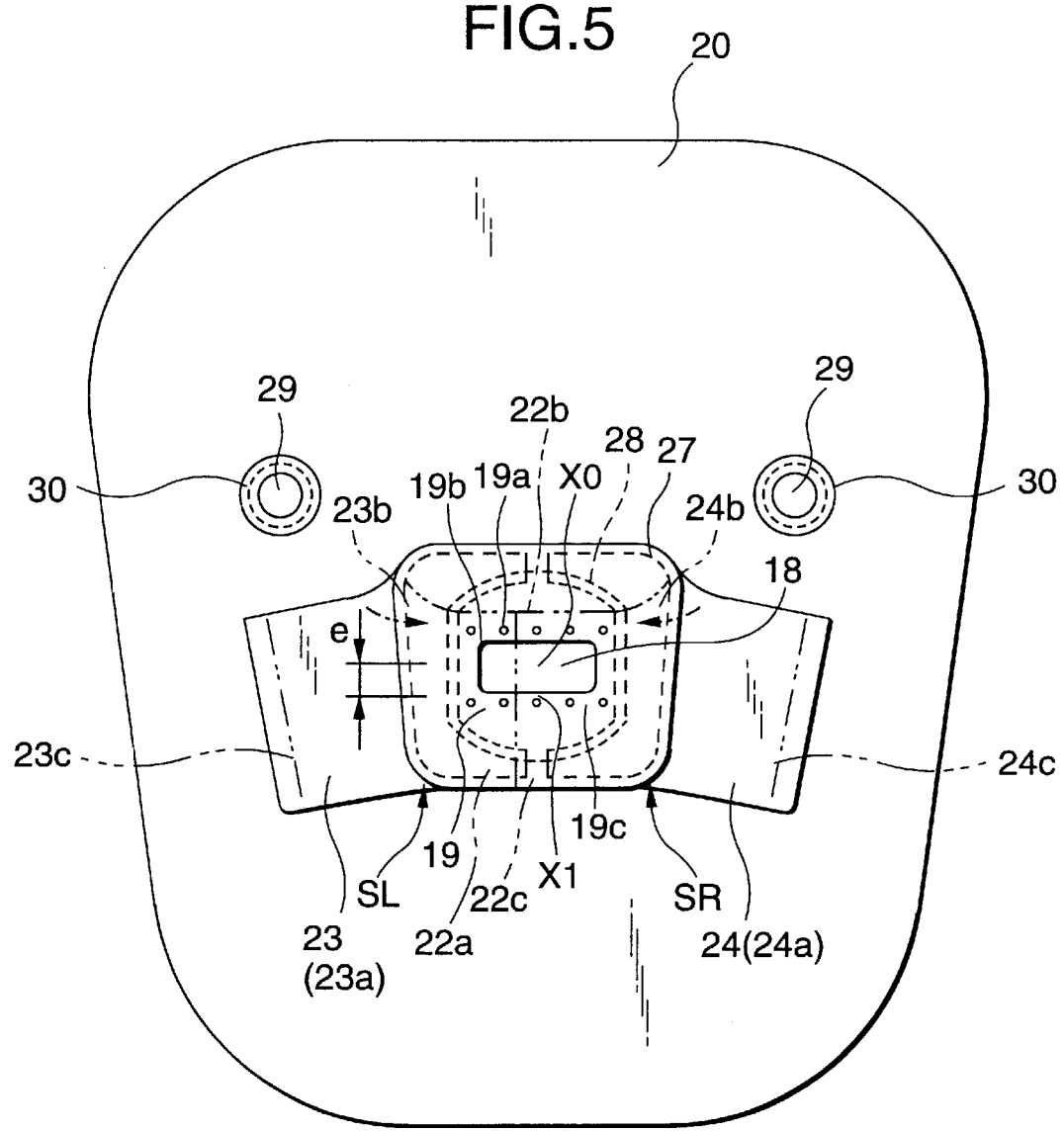
FIG. 5 is a view on the way of a step of manufacturing the air bag of the first embodiment, showing a state where predetermined punching has been given to a side wall portion of an inlet.

The flow control cloth 22 in this embodiment is, as shown in FIGS. 3 to 6, formed in such a manner that two cloth materials 23 and 24 consisting of woven cloth such as polyamide yarn, polyester yarn or the like having flexibility are sewn on the attachment piece portion 19 and further on each other by use of a surgical stitch 27 (see FIG. 5). Each cloth material 23, 24 is constituted by a substantially rect-angular attachment base portion 23a, 24a sewn on the attachment piece portion 19, and a front end portion 23b, 24b extending from the attachment base portion 23a, 24a and sewn on each other in a seam portion 23c, 24c. The gas inlet 18 is covered with a cover portion 22a formed by sewing the front end portions 23b and 24b on each other. This cover portion 22a is arranged so that its center X1 is shifted from the center X0 of the gas inlet 18 toward the rear side of the vehicle. In the case of this embodiment, this shifted distance e is set to be about 40 mm.

Further, in the flow control cloth 22 in this embodiment, sewing positions SL and SR on the left and right sides of the front end portions 23b and 24b respectively, where the attachment base portions 23a and 24a of the cloth materials 23 and 24 are sewn on the inlet-side-wall portion 20 are tapered to be open outward on the front side of the vehicle as shown in FIG. 5. In addition, the front end portions 23b and 24b are sewn on each other in the left/right direction of the vehicle by use of the mutual seam portions 23c and 24c as shown by the two-dot chain line in FIG. 5. Thus, the cover portion 22a is arranged so that its front edge 22b is made longer than its rear edge 22c.

Description will be made hereunder about manufacturing the air bag 17 in this embodiment. First, as shown in FIG. 6, in the state where the gas inlet 18 is not provided yet, the reinforcing cloths 28 and 28 and the attachment base portions 23a and 24a of the cloth materials 23 and 24 are set and sewn, by the surgical stitch 27, on a portion of the inlet-side wall portion 20 which is to be the inner circumferential surface side of the air bag 17 and in which the gas inlet 18 is to be disposed. In addition, reinforcing cloths 30 (see FIG. 5) are set and sewn on portions of the inlet-side wall portion 20 where the vent holes 29 and 29 are to be disposed, respectively. Then, as shown in FIG. 5, the gas inlet 18, the attachment holes 19a and the vent holes 29 are formed by punching.

Next, the inlet-side wall portion 20 and the ceiling wall portion 21 are put on each other in their portions which are to be on the outer circumferential surface side of the air bag 17, and their circumferential edges are sewn on each other. Further, the air bag 17 is turned over by use of the gas inlet 18 so that margins to seam at the circumferential edges are not exposed to the outer surface side. Then, the front end portions 23b and 24b of the cloth materials 23 and 24 are extracted from the gas inlet 18, and the seam portions 23c and 24c are sewn on each other to thereby form the cover portion 22a, as shown by the two-dot chain line in FIG. 5. If the cover portion 22a is received in the air bag 17, the producing of the air bag 17 is completed.

Next, a step of folding the air bag 17 in this embodiment will be described. As shown in FIG. 7(A), first, the air bag 17 is folded so that the side of the ceiling wall portion 21 which is opposite to the gas inlet 18 is made close to the gas inlet 18.

Then, as shown in FIGS. 7(A) and (B), a front portion 17a of the air bag 17 is creased with a transverse crease H0 and folded in two so that a front edge 31 of the air bag 17 is made close to the vicinity of a central portion 21a of the ceiling wall portion 21. At this time, the front portion 17a of the air bag 17 is constituted by a lapping-over portion 36 which is folded back and a lapped-over portion 37 which is lapped over by the lapping-over portion 36.

To fold transversely is to crease with a crease H (H0 and H1 which will be described later) in a left/right-direction so that this transverse crease H meets the left/right direction of a vehicle when the air bag system M is mounted on the vehicle.

Next, as shown in FIG. 7(B) and (C), transverse folding is done with creases H1 so that a crease portion 39 which is a front-side edge created by the crease H0 and a rear edge 32 are made close to each other near a center 01.

In this transverse folding, in the case of this embodiment, in a condition that the lapping-over portion 36 is kept lapping over the lapped-over portion 37, the front portion 17a of the air bag 17 is creased with creases H1 and folded in the form of bellows in which valley-folding and mountain-folding are repeated alternately, while the rear portion 17b is roll-folded so that the rear edge 32 is rolled toward the gas inlet 18 and put on the ceiling wall portion 21, that is, the rear portion 17b is folded to roll inward.

Then, as shown in FIG. 7(D), longitudinal folding is done so that left and right edges 33 and 34 are made close to each other near a center O2. This longitudinal folding is to crease with a crease V in a front/rear direction so that this longitudinal crease V meets the front/rear direction of a vehicle when the air bag system M is mounted on the vehicle. In the case of this embodiment, the left and right edges 33 and 34 are folded to roll inward, that is, folded and rolled toward the gas inlet 18 side.

Practically, when the air bag 17 is folded as shown in FIGS. 7(B) to (D), the folding is done in the state where the retainer 12 is received in the air bag 17 while the bolts 12a are made to project from the respective attachment holes 19a.

After the air bag 17 is folded up thus, the air bag 17 is covered with a breakable sheet material 16 (see FIG. 1) such as non woven fabric, film or the like in the state where the respective bolts 12a are made to project, in order to prevent the folding from being loosened. Then, the air bag 17 is received in the case body 8 in which the diffuser 11 and the inflator 10 have been disposed, while the respective bolts 12a of the retainer 12 are inserted into the through holes 11b and 8d. Next, the cover 14 is put over the body 8 so that the protrusion portions 8f of the circumferential wall 8e are locked in the circumferential edges of the respective lock holes 14e of the side wall portions 14d. Further, the pressing plate material 9 is put around the body 8 from the bottom side of the body 8 so that the bolts 12a are inserted into the respective through holes 9a and the plug pieces 9b are inserted into the respective insertion holes 8g. Thus, if the nuts 13 are screwed to the respective bolts 12a, the assembling of the air bag system M is completed. Then, the lock nails 14b of the cover 14 is locked at the opening circumferential edge 2b of the instrument panel 2, while a not-shown bracket extending from the case 7 is connected and fixed to a frame of the vehicle. Thus, the air bag system M can be mounted in a desired portion of an instrument panel 2, as shown in FIGS. 1 and 2.

If inflating gas is discharged from the gas discharge ports 10a of the inflator 10 after the air bag system M is mounted on the vehicle, inflating gas G flows into the air bag 17 through the gas inlet 18. At this time, since the gas inlet 18 is covered with the ceiling wall portion 21 through the cover portion 22a of the flow control cloth 22, first, the vicinity of the central portion 21a of the ceiling wall portion 21 and the crease portion covering the vicinity of the central portion 21a move upward to leave the gas inlet 18 to thereby rupture the rupture presumptive portion 14c of the cover 14 to open the doors 15 and 15, so that the air bag 17 is unfolded and inflated as shown by the two-dot chain line in FIG. 8.

At this time, the air bag 17 in this embodiment projects from the opening 2a of the instrument panel 2, and first inflates while unfolding on the opposite sides in the left/right direction so as to release the longitudinal folding. In addition, the inflating gas G flowing into the air bag 17 branches out forward and backward through the cover portion 22a of the flow control cloth 22, so that the air bag 17 wants to be unfolded quickly on the opposite sides in the front/rear direction.

In the front portion 17a of the air bag 17, first, the lapping-over portion 36 folded back and the lapped-over portion 37 lapped over by this lapping-over portion 36 are unfolded quickly together so as to release the bellows.

In addition, in the front portion 17a of the air bag 17, the lapping-over portion 36 leaves the lapped-over 2 portion 37 and rotates forward so as to release the crease H0, around the crease portion 39 where the lapping-over portion 36 is folded over the lapped-over portion 37.

Figure 8:
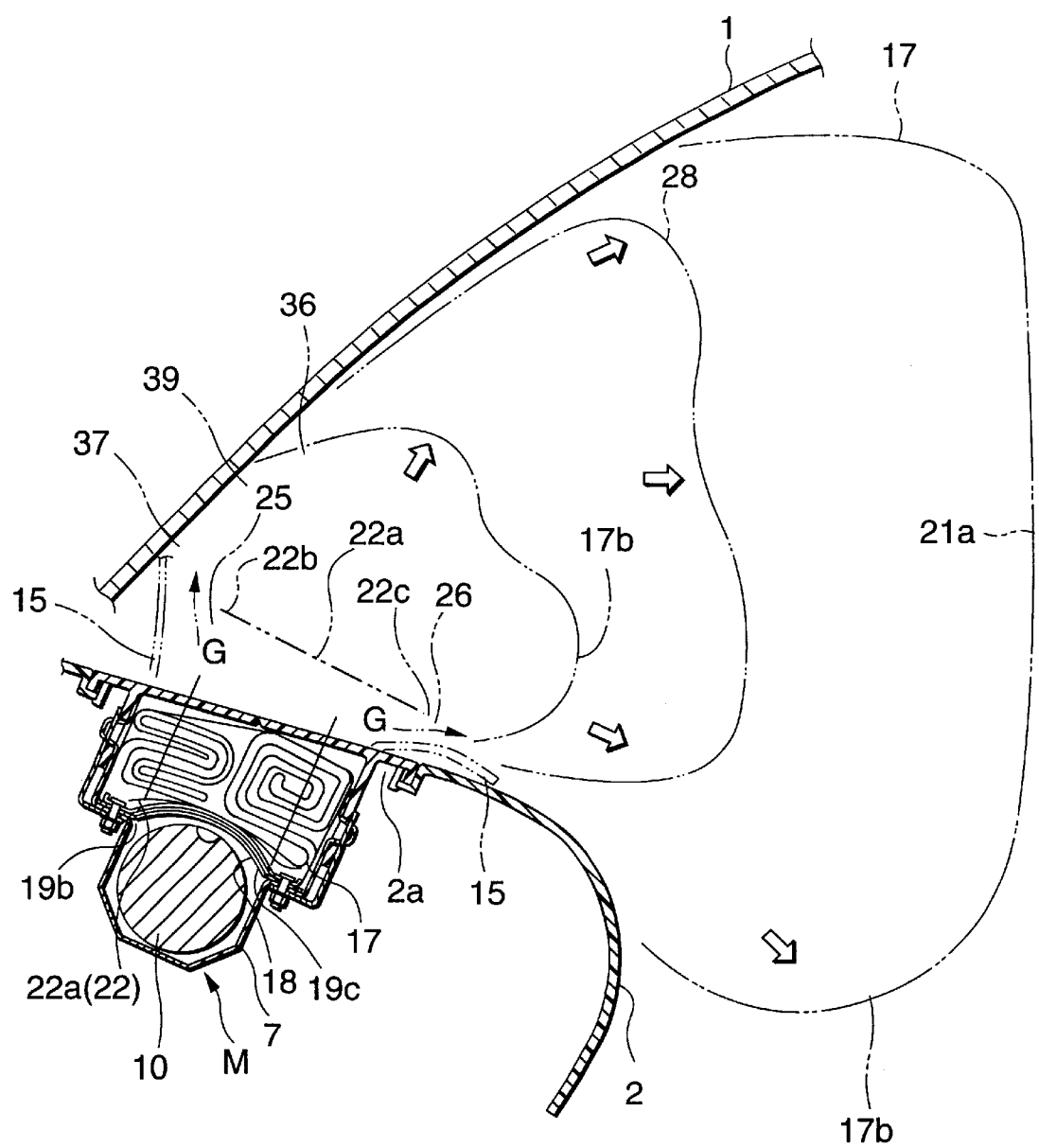
FIG. 8 is a schematic view showing a state where the air bag of the first embodiment is inflated.
Figure 9:
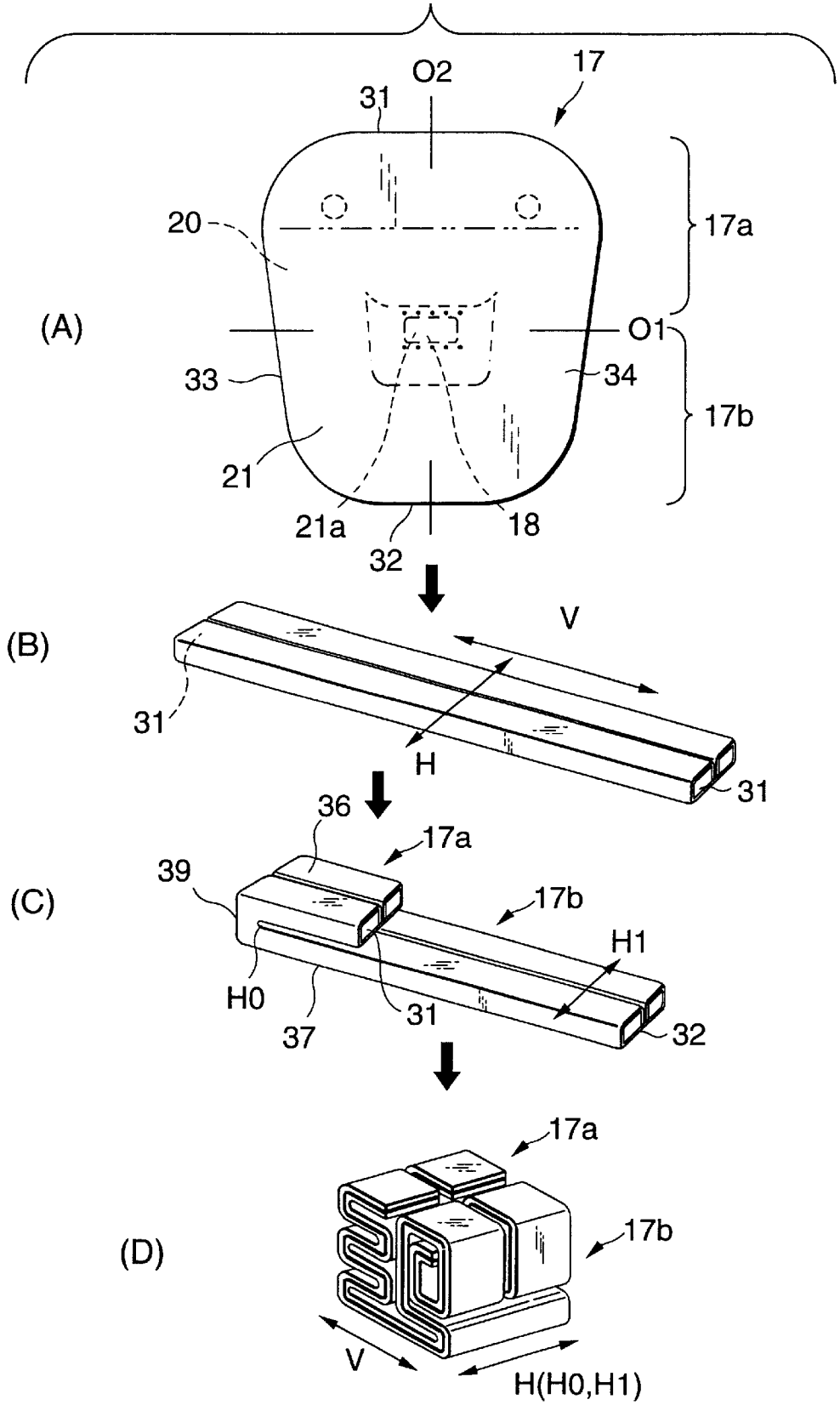
FIG. 9 is a view for explaining another step of folding the air bag in the first embodiment.
Figure 10:
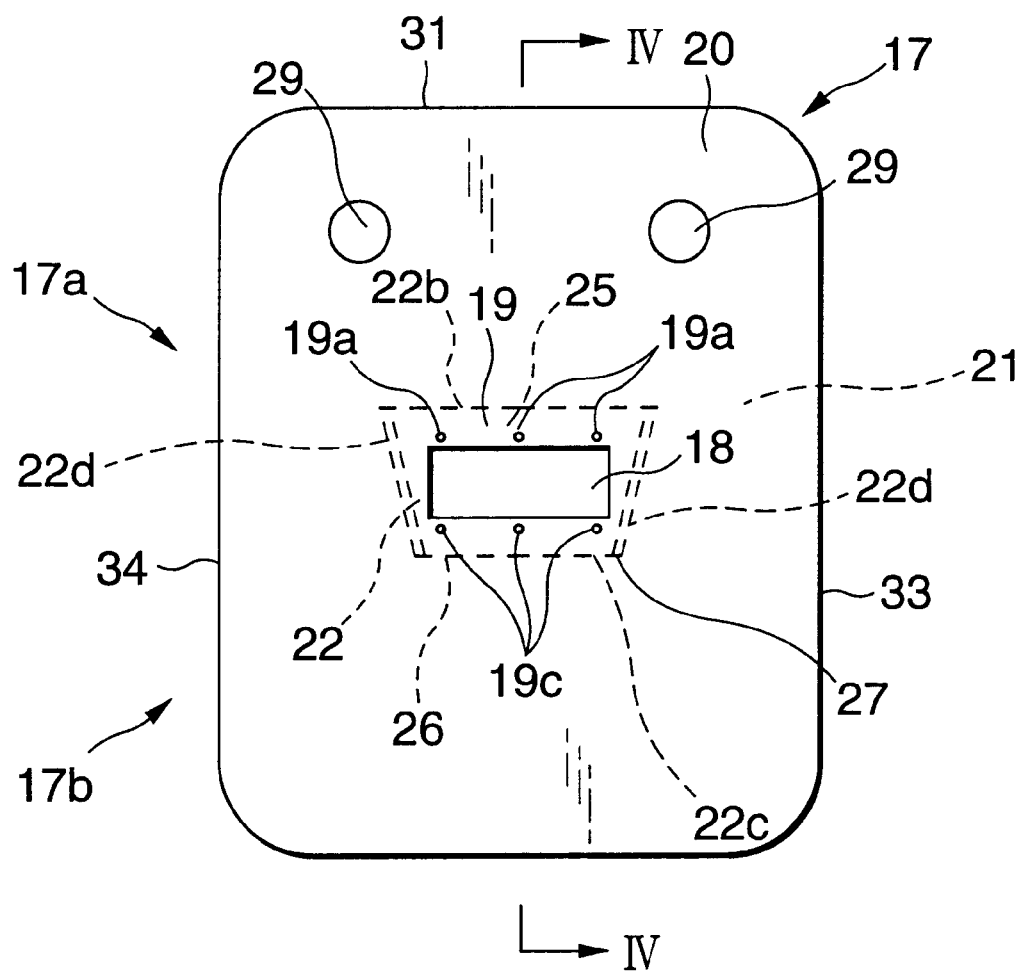
FIG. 10 is a bottom view of an air bag used in a second embodiment.
Figure 11:
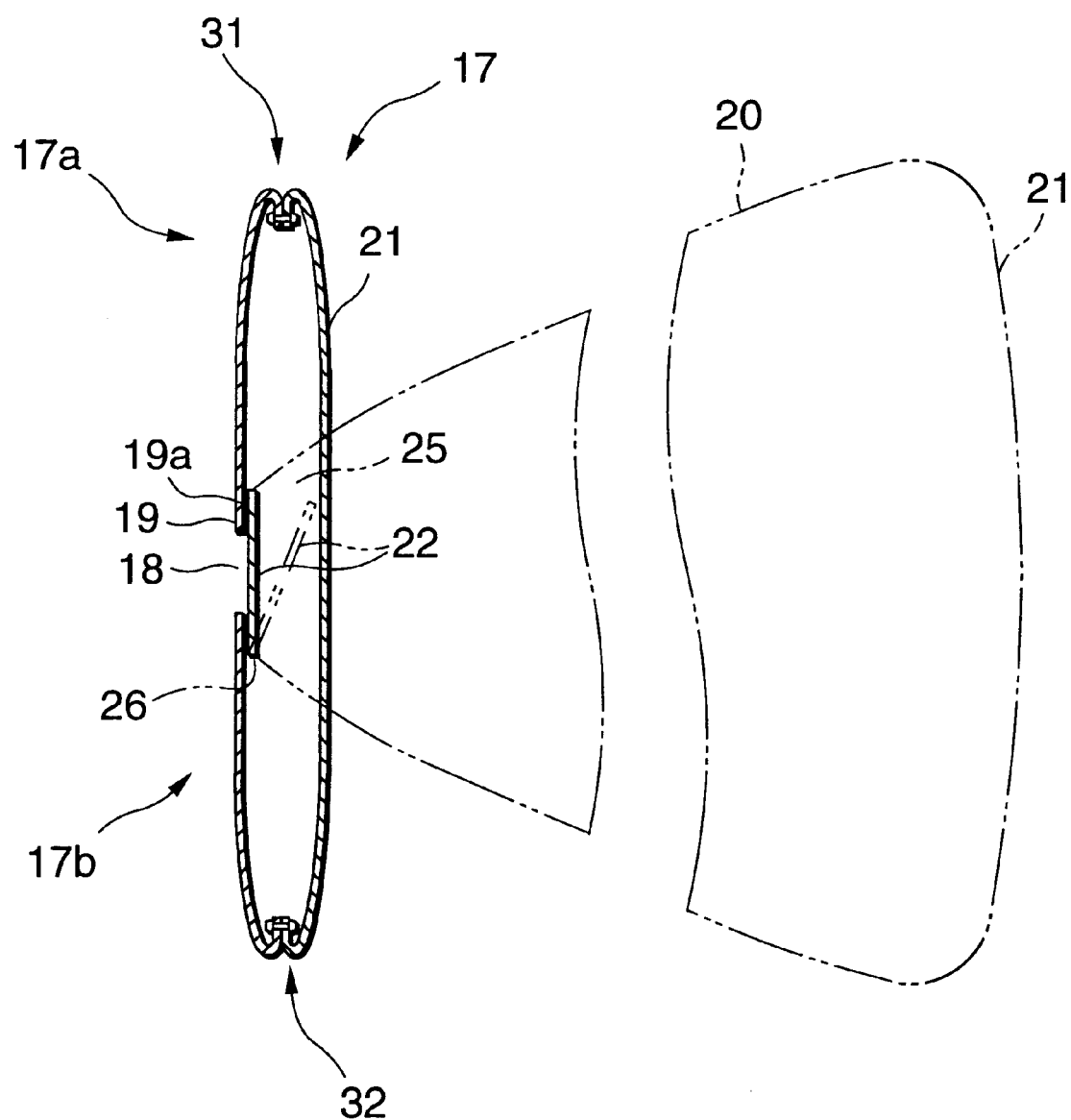
FIG. 11 is a sectional view taken on line IV—IV of FIG. 10.

Next, as shown by the two-dot chain line in FIG. 8, the lapped-over portion 37 and the lapping-over portion 36 which is unfolded along the wind shield 1 further unfold so as to release the transverse creases H0 and H1. Thus, the air bag 17 reaches a fully inflated state.

Further, in the air bag system M in this embodiment, when the inflating gas flows into the air bag 17, the flow control cloth 22 disposed inside the air bag 17 shifts the center X1 of the cover portion 22a covering the gas inlet 18 so that the center X1 is shifted from the center X0 of the gas inlet 18 toward the rear side of the vehicle. Accordingly, the distance between the front edge 19b of the gas inlet 18 and the front edge 22b of the cover portion 22a is short, while the distance between the rear edge 19c of the gas inlet 18 and the rear edge 22c of the cover portion 22a is long. As a result, as shown in the two-dot chain line in FIG. 4 or 8, the inflating gas G flowing in through the gas inlet 18 flows into the air bag 17 mainly from the front edge 22b side of the cover portion 22a having a low resistance to the passage of the inflating gas G.

As a result, the flow rate of the inflating gas G through the front opening 25 formed by the cover portion 22a of the flow control cloth 22 can be ensured to be higher than that through the rear opening 26.

In addition, the cover portion 22a of the flow control cloth 22 is arranged simply to be shifted from the center X0 of the gas inlet 18 toward the rear side of the vehicle without elongating the front edge 22b. It is therefore possible to cope with this easily without using a plenty of material.

Thus, in the passenger seat air bag system M in this embodiment, the material for the flow control cloth 22 can be restrained from increasing, while the flow rate of the inflating gas G through the front opening 25 formed by the flow control cloth 22 can be easily ensured to be higher than that through the rear opening 26.

Incidentally, if the length of the cover portion 22a in the front/rear-direction is made equivalent to that in the background art, the rear edge 22c of the cover portion 22a is disposed to extend toward the rear side of the vehicle correspondingly to the distance shifted toward the rear side. In this case, the rear opening 26 formed between the rear edge 22c of the cover portion 22a and the inlet-side-wall portion 20 is disposed on the rear side of the vehicle, so that the inflating gas G flows along the instrument panel 2 at the time of unfolding and inflation, and the rear portion 17b of the air bag 17 can be further unfolded along the top surface of the instrument panel 2. Thus, the angle of the air bag 17 unfolded vertically when the air bag 17 is unfolded and inflated is ensured to be larger, and the air bag 17 moves, with a large face, toward the rear side of the vehicle, so that it is possible to contribute to the improvement of the passenger binding performance on the way of inflation.

The cover portion 22a is arranged such that the center X1 of the cover portion 22a shifted within a range that the front edge 22b of the cover portion 22a is disposed in a more forward side than the front edge 19b of the gas inlet 18. This is because, if the front edge 22b of the cover portion 22a were disposed behind the front edge 19b of the gas inlet 18, the inflating gas G would flow into the air bag 17 without having any intervention of the cover portion 22a of the flow control cloth 22 when the air bag 17 is unfolded and inflated, so that it would be meaningless to provide the flow control cloth 22.

In addition, in this embodiment, since the front portion 17a of the air bag 17 is folded in the form of bellows, the front portion 17a unfolds quickly when the air bag 17 is unfolded and inflated. On the other hand, since the rear portion 17b of the air bag 17 is folded to roll inward so as to have a high resistance against unrolling, and since the unfolding direction of the rear edge 32 side of the air bag 17 is made downward reversely to the direction of flowing the inflating gas G into the air bag 17. Accordingly, the rear portion 17b unfolds, along the instrument panel, downward and slower than the front portion.

As a result, the front portion 17a of the air bag 17 unfolds quickly toward the rear side of the vehicle along the wind shield 1, while the rear portion 17b of the air bag 17 unfolds later toward the rear side of the vehicle along the instrument panel 2. Accordingly, the ceiling wall portion 21 of the air bag 17 which is on the way of unfolding and inflation moves toward the rear side of the vehicle while having a face which is wide and close to the vertical plane, so that the passenger binding performance on the way of unfolding and inflation can be improved further.

Further, particularly in this embodiment, the front portion 17a of the air bag 17 is folded in the form of bellows in the state where the front edge 31 is folded back to lap over the ceiling wall portion 21 when the air bag 17 is transversely folded.

Accordingly, when the air bag 17 is unfolded and inflated, in the front portion 17a of the air bag 17, the lapping-over portion 36 and the lapped-over portion 37 lapped over by this lapping-over portion 36 unfold quickly together so as to release the bellows. However, the lapping-over portion 36 separates from the lapped-over portion 37 and rotates forward around the crease portion 39 where the lapping-over portion 36 is folded over the lapped-over portion 37 so as to release the crease H0. Accordingly, all the front portion 17a of the air bag 17 does not project to abut against the wind shield 1.

It is therefore possible to restrain an impact upon the wind shield 1 in comparison with the case where the front portion 17a of the air bag 17 is simply folded in the form of bellows. In addition, the front edge 31 of the air bag 17 does not touch the wind shield 1 until the lapping-over portion 36 rotates forward around the crease portion 39 where the lapping-over portion 36 is folded. Accordingly, the length with which the front edge 31 rubs against the wind shield 1 is shortened, and the length with which other portions of the air bag 17 rubs against the wind shield 1 also becomes shorter than that of the front edge 31 in the case where the front portion 17a of the air bag 17 is simply folded in the form of bellows, so that it is possible to contribute to restraining the air bag 17 from being damaged.

Not to say, if such an operation or effect is not taken into consideration, the front portion 17a of the air bag 17 may be simply folded in the form of bellows in which valley-folding and mountain-folding are repeated alternately so that the front portion 17a is made close to the central portion 21a of the ceiling wall portion 21.

The rear portion 17b are not necessary to be folded to roll inward when the air bag 17 is transversely folded. The air bag 17 may be transversely folded in a roll-folding manner having a large resistance when the air bag 17 is unfolded and inflated, for example, the rear portion 17b is folded to roll outward so that the rear edge 32 is rolled toward the central portion 21a of the ceiling wall portion 21 and put on the ceiling wall portion 21. In this case, the unfolding speed of the rear portion 17b becomes less than that of the front portion 17a, so that it is possible to contribute, to some extent, to arranging the ceiling wall portion 21 vertically when the air bag 17 is unfolded and inflated. Not to say, if such an operation or effect is not taken into consideration, the rear portion 17b may be folded in the form of bellows.

Although the embodiment shows the case where inward-roll-folding is adopted for longitudinally folding of the air bag 17, the air bag 17 may be subjected to modified inward-roll-folding in which the left and right edges 29 and 30 are folded toward the gas inlet 18, and then the folded portion is put on the central side of the ceiling wall portion 21, as shown in FIG. 7(E).

If the air bag 17 is thus longitudinally folded by inward-roll-folding or modified inward-roll-folding so that the folded portion is disposed on the central side of the ceiling wall portion 21, the left and right edges 29 and 30 can be restrained from unfolding toward the passenger when the air bag 17 is inflated, in comparison with the case of bellows-folding or outward roll-folding. As a result, preferably, the ceiling wall portion 21 moves toward the passenger with a wide face further spreading in the left/right direction.

Further, although the embodiment shows the case where the air bag 17 is transversely folded before being longitudinally folded, the air bag 17 may be transversely folded after being longitudinally folded, and the front portion 17a may be folded in the form of bellows in the lapping-over state when the air bag 17 is transversely folded.

That is, as shown in FIGS. 9(A) and (B), first, the air bag 17 is subjected to longitudinal folding such as outward roll-folding, bellows-folding or the like, so that the left and right edges 33 and 34 of the air bag 17 are made close to the center 02 side.

Next, as shown in FIG. 9(C), the front portion 17a of the air bag 17 is creased with a transverse crease H0 and folded in two so that the front edge 31 of the air bag 17 is made close to the vicinity of the central portion 21a of the ceiling wall portion 21.

Then, as shown in FIG. 9(D), the front portion 17a of the air bag 17 is creased with a crease H1 and transversely folded so that the crease portion 39 which is to be a front-side edge created by the crease H0 and the rear edge 32 are made close to the vicinity of the center O1. In this transverse folding, it will go well if the front portion 17a of the air bag 17 folded up is folded in the form of bellows while the rear portion 17b is transversely folded by inward-roll-folding.

In addition, in this embodiment, the openings 25 and 26 in the front/rear direction of the vehicle inside the air bag 17 which are formed by the cover portion 22a of the flow control cloth 22 are arranged so that the front edge 22b of the cover portion 22a is made longer than the rear edge 22c to thereby make the front opening 25 larger in the opening area than the rear opening 26. Accordingly, it is possible to ensure a high flow rate of the inflating gas G into the air bag front portion 17a, so that the vicinity of the central portion 21a of the ceiling wall portion 21 is easily arranged vertically when the air bag 17 is unfolded and inflated, and the passenger binding performance is improved on the way of the unfolding and inflation. Therefore, in order to control the flow rate of the inflating gas G in the front and rear directions, both the shift of the cover portion 22a toward the rear side of the vehicle and the adjustment of length on the edges 22b and 22c may be used together, as shown in the embodiment.

Next, a second embodiment of the present invention is shown in FIGS. 10 to 14.

An air bag 17 in this embodiment has a flow control cloth 22 constituted by a sheet of woven cloth. The flow control cloth 22 is formed of woven cloth similar to that of an inlet-side wall portion 20 of the air bag 17. Left and right edges 22d and 22d are sewn on the inlet-side wall portion 20 by use of a surgical stitch 27. In the flow control cloth 22 in this embodiment, the areas of openings 25 and 26 in the front/rear direction of the vehicle (the opening areas provided between front and rear edges 22b and 22c of the flow control cloth 22 and the inlet-side wall portion 20) are established in such a manner that the front edge 22b of the flow control cloth 22 is formed to be longer than the rear edge 22c so that the front opening 25 becomes larger than the rear opening 26, in the same manner as in the first embodiment.

Figure 12:
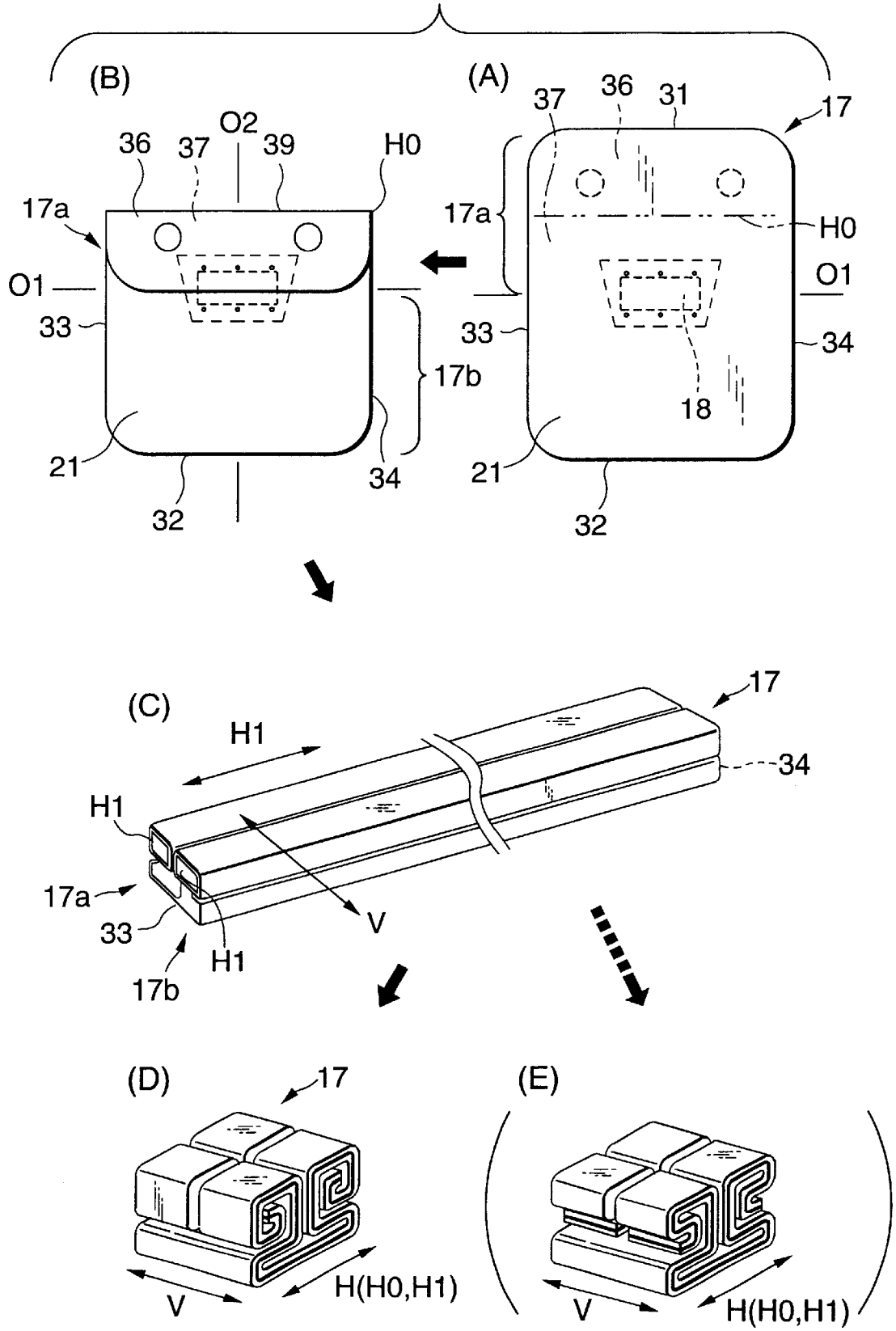
FIG. 12 is a view for explaining a step of folding the air bag in the second embodiment.

Although FIG. 12 shows a step of folding the air bag in this embodiment, the step is substantially the same as that in the first embodiment, and therefore details thereof are omitted.

Figure 13:
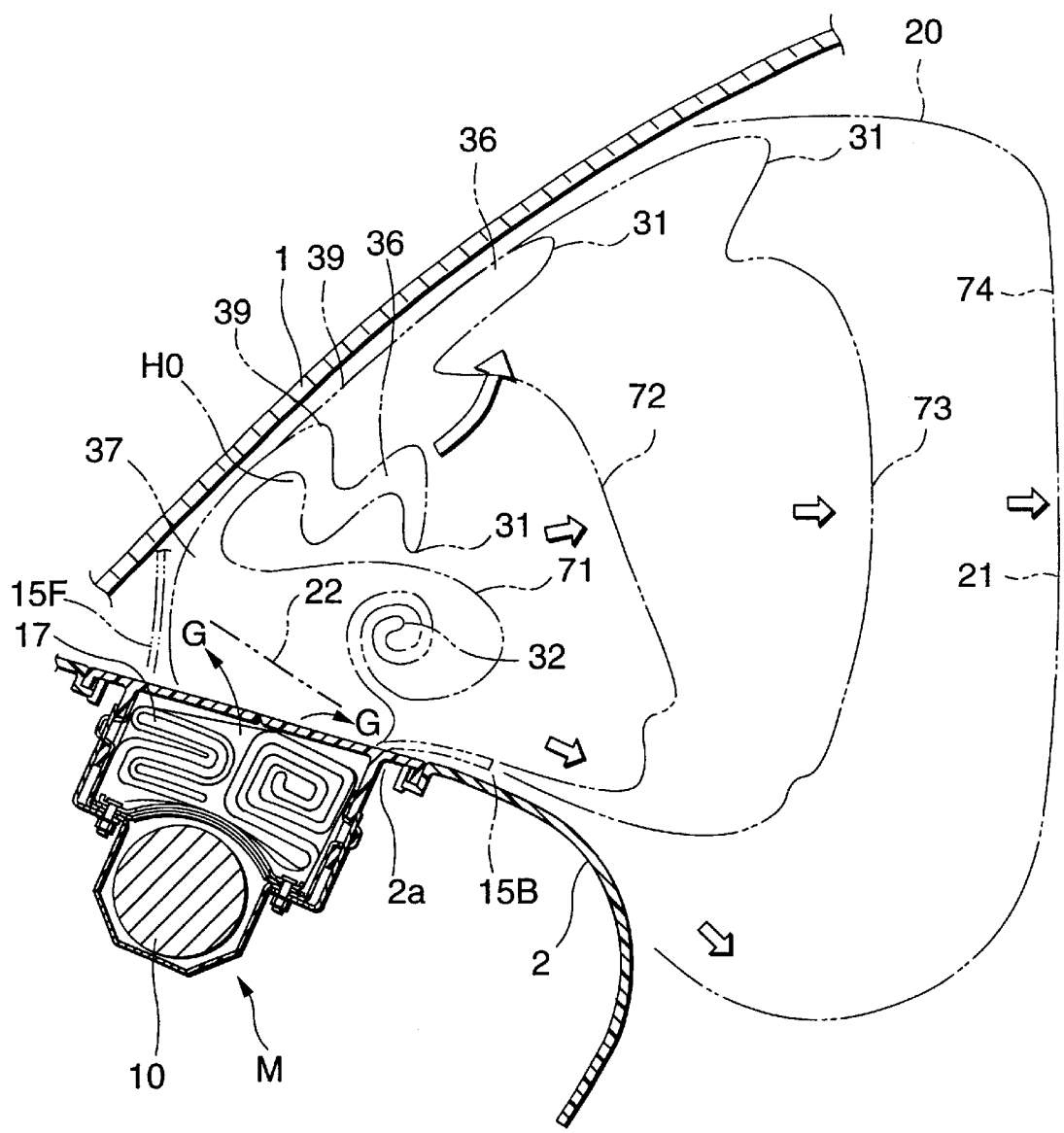
FIG. 13 is a schematic view showing a state where the air bag of the second embodiment is inflated.

The air bag in this embodiment unfolds and inflates as shown by the two-dot chain line in FIG. 13. As shown in a visible outline 71 of the air bag 17 in FIG. 13, a lapping-over portion 36 separates from a lapped-over portion 37 and rotates forward around a crease portion 39 where the lapping-over portion 36 is folded over the lapped-over portion 37, so as to release a crease H0 of the crease portion 39.

Then, as shown in a visible outline 72 of the air bag 17 in FIG. 13, the lapped-over portion 37 and the lapping-over portion 36 which is unfolded along a wind shield 1 further unfold so as to release transverse creases H0 and H1. Thus, the air bag 17 is in a fully inflated state shown by a visible outline 74 through a visible outline 73.

That is, in the air bag system M in this embodiment, the portion which is to give a strong impact on the wind shield 1 is the crease portion 39 where the lapping-over portion 36 is folded over the lapped-over portion 37 at the incipient stage of the unfolding and inflation.

The portion which is inflated to make the crease portion 39 abut against the wind shield 1 is the lapping-over portion 36 and the lapped-over portion 37 which is under the crease portion 39. However, the lapping-over portion 36 is to rotate forward around the crease portion 39, so that the portion which receives the pressure of inflating gas G to thereby abut against the wind shield 1 becomes a short portion of only the lapped-over portion 37.

Therefore, the energy of the impact against the wind shield 1 when the air bag 17 is unfolded and inflated turns into the energy with which the short lapped-over portion 37 unfolds and inflates to release the creases HI folded in the form of bellows. Since the lapped-over portion 37 is small in volume and small in size, the impact given to the wind shield 1 can be reduced in comparison with the case where the front portion 17a of the air bag 17 is simply folded in the form of bellows.

In addition, the vicinity of a front edge 31 of the air bag 17 does not touch the wind shield 1 before the lapping-over portion 36 rotates forward around the crease portion 39, as shown by the visible outline 72 of the air bag 17. Accordingly, the length with which the front edge 31 side of the air bag 17 rubs against the wind shield 1 is shortened, and the length with which other portions of the air bag 17 rub against the wind shield 1 also becomes shorter than that of the vicinity of the front edge 31 of the air bag 17 in the case where the front portion 17a of the air bag 17 is simply folded in the form of bellows, so that it is possible to restrain the air bag 17 from being damaged.

In the passenger seat air bag system M in this embodiment, therefore, the front portion 17a of the air bag 17 can be unfolded quickly at the time of unfolding and inflation while being restrained from giving an impact on or rubbing against the wind shield 1, so that it is possible to improve the passenger binding performance.

In addition, in this second embodiment, when the air bag 17 is transversely folded, a rear portion 17b is folded to roll inward in the same manner as in the first embodiment.

Accordingly, the rear portion 17b becomes difficult to unfold and inflate in comparison with the front portion 17a.

Thus, it is possible to reduce the inflating speed of the ceiling wall portion 21 of the air bag 17 toward the rear side of the vehicle, so that it is possible to reduce the inflating speed of the air bag 17 toward a passenger. As a result, even if the air bag 17 binds the passenger on the way of its inflation, it is possible to restrain the pressing force on the passenger.

In addition, although the second embodiment shows the case where inward-roll-folding is adopted for longitudinally folding of the air bag 17, the air bag 17 may be subjected to modified inward-roll-folding, in the same manner as that in the first embodiment, in which left and right edges 33 and 34 are folded toward the gas inlet 18, and then the folded portion is put on the central side of the ceiling wall portion 21, as shown in FIG. 12(E).

Figure 14:
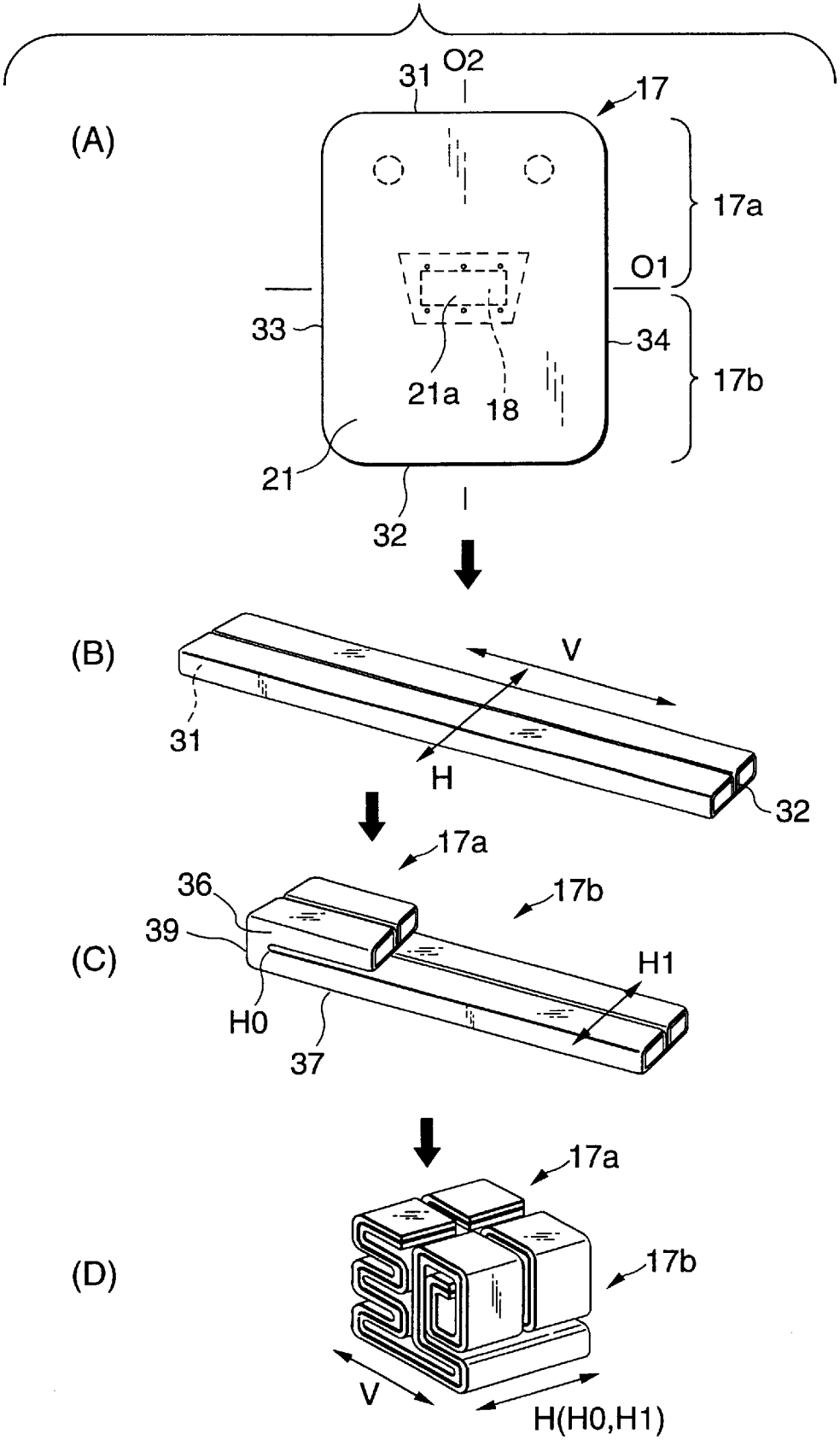
FIG. 14 is a view for explaining another step of folding the air bag in the second embodiment.

Further, although the second embodiment shows the case where the air bag 17 is transversely folded before being longitudinally folded, the air bag 17 may be transversely folded after being longitudinally folded in the same manner as that in the first embodiment, and the front portion 17a may be folded in the form of bellows in the lapping-over state when the air bag 17 is transversely folded as shown in FIG. 14.

Moreover, although the first and second embodiments show the air bag 17 provided with the flow control cloth the flow control cloth 22 may be omitted if its effect is ignored.

That is, an air bag folded by a method according to the present invention has above-mentioned effects even without the flow control cloth 22.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. A passenger seat air bag system comprising:
   a case received in an instrument panel disposed under a wind shield of a vehicle;
   a door formed as a portion of a top surface of said instrument panel in an upper portion of said case; and
   a folded air bag received and fixed in said case,
   wherein, when inflating gas flows into said air bag through a gas inlet of said air bag, said air bag is unfolded and inflated to open said door so that said air bag projects from said door and expands toward a rear side of said vehicle along said wind shield, wherein said air bag comprises:
a ceiling wall portion opposite to said gas inlet;
front and rear edges located on front and rear sides of said vehicle; and
left and right edges located on left and right sides of said vehicle, wherein, before said air bag is unfolded, said air bag is folded so that said ceiling wall portion is disposed close to said gas inlet, while said air bag is transversely folded so that said front and rear edges are disposed close to each other near a center of said air bag in front/rear direction of said vehicle, while said air bag is longitudinally folded so that said left and right edges are made close to each other near the center of said air bag in the right/left direction of said vehicle, and wherein a front portion of said air bag is folded in a form of bellows in a state where said front edge is folded to lap over said ceiling wall portion.

2. A passenger seat air bag system according to claim 1, wherein a rear portion of said air bag is folded to roll inward.

3. A passenger seat air bag system comprising:

a case received in an instrument panel of a vehicle;
a door formed as a portion of a top surface of said instrument panel in an upper portion of said case; and
a folded air bag received and fixed in said case, wherein, when inflating gas flows into said air bag through a gas inlet of said air bag, said air bag is unfolded and inflated to open said door so that said air bag projects from said door, and expands toward a rear side of said vehicle, wherein said air bag comprises:
an air bag main body having said gas inlet; and
a flow control cloth attached to an inside of said air bag main body so as to cover said gas inlet in a condition that said flow control cloth closes opposite sides of said gas inlet in right/left direction of said vehicle while said flow control cloth leaves opposite sides of said gas inlet in front/rear direction of said vehicle opened, and said flow control cloth being disposed so that a center of said flow control cloth in the front/rear direction of said vehicle is shifted from a center of said gas inlet in the front/rear direction of said vehicle toward the rear side of said vehicle.

4. A passenger seat air bag system according to claim 3, wherein the center of said flow control cloth is disposed so as to be shifted within a range where a front edge of said flow control cloth is disposed in a more forward side of said vehicle than a front edge of said gas inlet.

5. A passenger seat air bag system according to claim 3, wherein a front edge of said flow control cloth is disposed in a more forward side of said vehicle than a front edge of said gas inlet.

6. A passenger seat air bag system according to claim 3, wherein said flow control cloth has a tapered shape which is open outside on the front side of said vehicle.

7. A passenger seat air bag system according to claim 3, wherein a front edge of said flow control cloth is formed so as to be longer than a rear edge thereof.

8. A passenger seat air bag system according to claim 3, wherein front and rear openings are defined by said air bag main body and said flow control cloth so that said front opening is wider than said rear opening.

9. A passenger seat air bag system comprising:

a case received in an instrument panel disposed under a wind shield of a vehicle;
a door formed as a portion of a top surface of said instrument panel in an upper portion of said case; and
a folded air bag received and fixed in said case, wherein, when inflating gas flows into said air bag through a gas inlet of said air bag, said air bag is unfolded and inflated to open said door so that said air bag projects from said door, and expands toward a rear side of said vehicle along said wind shield;

wherein said air bag comprises:
a ceiling wall portion opposite to said gas inlet;
front and rear edges located on front and rear sides of said vehicle;
left and right edges located on left and right sides of said vehicle; and
a flow control cloth attached to an inside of an air bag main body so as to cover said gas inlet in a condition that said flow control cloth closes opposite sides of said gas inlet in right/left direction of said vehicle while said flow control cloth leaves opposite sides of said gas inlet in front/rear direction of said vehicle opened, said flow control cloth being disposed so that a center of said flow control cloth in the front/rear direction of said vehicle is shifted from a center of said gas inlet in the front/rear direction of said vehicle toward the rear side of said vehicle, wherein before said air bag is unfolded, said air bag is folded so that said ceiling wall portion is disposed close to said gas inlet, while said air bag is transversely folded so that said front and rear edges are disposed close to each other near the center of said air bag in the front/rear direction of said vehicle, and while said air bag is longitudinally folded so that said left and right edges are disposed close to each other near the center of air bag in the right/left direction of said vehicle, and wherein a front portion of said air bag is folded in a form of bellows in a state where said front edge is folded back to lap over said ceiling wall portion.

10. A passenger seat air bag system according to claim 9, wherein a rear portion of said air bag is folded to roll inward.

11. A passenger seat air bag system according to claim 9, wherein the center of said flow control cloth is disposed so as to be shifted within a range where a front edge of said flow control cloth is disposed in a more forward side of said vehicle than a front edge of said gas inlet.

12. A passenger seat air bag system according to claim 9, wherein a front edge of said flow control cloth is disposed in a more forward side of said vehicle than a front edge of said gas inlet.

13. A passenger seat air bag system according to claim 9, wherein said flow control cloth has a tapered shape which is open outside on the front side of said vehicle.

14. A passenger seat air bag system according to claim 9, wherein a front edge of said flow control cloth is formed so as to be longer than a rear edge thereof.

15. A passenger seat air bag system according to claim 9, wherein front and rear openings are defined by said air bag main body and said flow control cloth so that said front opening is wider than said rear opening.

* * * * *